United States Patent
Kestler et al.

(10) Patent No.: US 10,890,990 B2
(45) Date of Patent: Jan. 12, 2021

(54) ROTATION INPUT DEVICE FOR A CAPACITIVE SENSE CORD

(71) Applicant: Google LLC, Mountain View, CA (US)

(72) Inventors: Jordan A. Kestler, Pacifica, CA (US);
Peter M. Cazalet, Los Gatos, CA (US);
Jonathan B. Moeller, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 347 days.

(21) Appl. No.: 16/010,173

(22) Filed: Jun. 15, 2018

(65) Prior Publication Data

US 2019/0094992 A1    Mar. 28, 2019

Related U.S. Application Data (60) Provisional application No. 62/562,659, filed on Sep. 25, 2017.

(51) Int. Cl.
*G06F 3/0362* (2013.01)
*H04R 1/10* (2006.01)
(Continued)

(52) U.S. Cl.
CPC .......... *G06F 3/0362* (2013.01); *G06F 3/0338* (2013.01); *G06F 3/03547* (2013.01);
(Continued)

(58) Field of Classification Search
None
See application file for complete search history.

(56) References Cited

U.S. PATENT DOCUMENTS 9,807,852 B1 *  10/2017  Starner ............... H04R 1/1033
10,111,304 B2 * 10/2018  Starner ............... H05B 47/105
(Continued)

FOREIGN PATENT DOCUMENTS

EP    2388787          11/2011
EP    2388787 A1 *    11/2011    .......... H04M 1/6058

OTHER PUBLICATIONS

"International Search Report and Written Opinion", PCT Application No. PCT/US2018/050477, dated Dec. 3, 2018, 13 pages.
(Continued)

*Primary Examiner* — Paresh Patel
(74) *Attorney, Agent, or Firm* — Colby Nipper PLLC (57) ABSTRACT

This document describes techniques and devices for a rotation input device for a capacitive sense cord. A cord may be constructed that includes a cable, a plurality of sensing wires, and a rotation input device. The sensing wires are twisted around one another within a cable jacket of the cable throughout an insensitive portion of the cord that is insensitive to touch input. The rotation input device includes the plurality of sensing wires disposed proximate to a surface of the cord and positioned lengthwise along the cord to provide a capacitively sensitive portion of the cord. The plurality of sensing wires are independently sensitive to touch input. Also, the rotation input device is configured to enable rotational input based on a pattern of change in capacitance values corresponding to at least a subset of the plurality of sensing wires in the rotation input device.

20 Claims, 8 Drawing Sheets

(51) Int. Cl.
| | |
|---|---|
| *G06F 3/0338* | (2013.01) |
| *G06F 3/0354* | (2013.01) |
| *H01B 11/00* | (2006.01) |
| *G01D 5/24* | (2006.01) |
| *H01B 7/282* | (2006.01) |

(52) U.S. Cl.
CPC ........... *H01B 11/00* (2013.01); *H04R 1/1041* (2013.01); *G01D 5/24* (2013.01); *H01B 7/2825* (2013.01); *H04R 1/1033* (2013.01)

(56) References Cited

U.S. PATENT DOCUMENTS

| | | | |
|---|---|---|---|
| 10,402,020 B1* | 9/2019 | Starner | H04R 1/1041 |
| 2007/0237170 A1* | 10/2007 | Proctor | H04R 1/1033 |
| | | | 370/462 |
| 2013/0207715 A1* | 8/2013 | Salo | G06F 3/016 |
| | | | 327/517 |

OTHER PUBLICATIONS

"International Preliminary Report on Patentability", PCT Application No. PCT/US2018/050477, dated Apr. 19, 2020, 7 pages.

\* cited by examiner

ROTATION INPUT DEVICE FOR A CAPACITIVE SENSE CORD

RELATED APPLICATION

This application claims priority under 35 U.S.C. § 119(e) to U.S. Provisional Patent Application Ser. No. 62/562,659 filed Sep. 25, 2017, the disclosure of which is incorporated by reference herein in its entirety.

BACKGROUND

In-line controls for cords are standard and ubiquitous for devices such as earbuds or headphones for music players, cellular phone usage, and so forth. Similar in-line controls are also used by cords for household appliances and lighting, such as clocks, lamps, radios, and fans. Generally, such in-line controls are implemented via a combox that is in-line in the cord. The combox generally includes, among other parts, a printed circuit board (PCB), one or more buttons, an enclosure, and strain relief. However, implementing the combox imposes rigid design constraints on the product and increases the cost of the product. Conventional comboxes also have problems with intrusion due to moisture (e.g., sweat) and skin, which can lead to corrosion of internal controls and electrical shorts.

SUMMARY

This document describes techniques and devices for a rotation input device for a capacitive sense cord. A capacitive sense cord includes a cable, a rotation input device, and a cover that covers the cable and the rotation input device. The capacitive sense cord may be implemented as a variety of different types of cords, such as a cord for headphones, earbuds, data transfer, lamps, clocks, radios, fans, and so forth. The cover can be formed from a flexible, waterproof material that seals the cable and prevents water from permeating the seal. In implementations, the cover is configured to enable reception of touch input that causes a change in one or more capacitance values associated with sensing wires of the rotation input device. A controller, implemented at the cord or a computing device coupled to the cord, can detect the change in the capacitance values and trigger one or more functions associated with the change in capacitance values. For example, when implemented as a cord for a headset (e.g., headphones or ear buds), the controller can control audio to the headset, such as by playing the audio, pausing the audio, adjusting the volume of the audio, skipping ahead in the audio, skipping backwards in the audio, skipping to additional audio, and so forth.

This summary is provided to introduce simplified concepts concerning a rotation input device for a capacitive sense cord, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for a rotation input device for a capacitive sense cord are described with reference to the following drawings. The same numbers are used throughout the drawings to reference like features and components.

DETAILED DESCRIPTION

Overview

This document describes techniques and devices for a rotation input device for a capacitive sense cord. The cord may be implemented as a variety of different types of cords, such as a cord for headphones, earbuds, data transfer, lamps, clocks, radios, fans, and so forth. In another example, the cord may be implemented as a touchcord that can sense touch input at one or more locations along the cord.

The cord can be constructed of a cable, multiple capacitive sensing wires, an optional shield wire, and a cover. Any of the sensing wires or shield wire can be implemented as solid or stranded wires. In implementations, the wires are twisted around themselves inside the cable throughout a portion of the cord, such that the cord is insensitive to touch input throughout that portion of the cord. For example, the sensing wires can be a separate bundle inside an existing headphone cable. At least one portion of the cord is implemented as a capacitively sensitive interface (described herein as a "rotation input device") that is sensitive to touch input. In the capacitively sensitive interface, the sensing wires are disposed near a surface of the cord, but still under the cover, and run lengthwise along the cable. After the capacitively sensitive interface, the sensing wires are again twisted together, or can optionally be terminated and not continue past the capacitively sensitive area. In addition, the cover can be configured to completely cover the wires and cable, secure them in place, and hide them from a user and the environment.

Using the sensing wires, a controller can detect a pattern of changing capacitance values of different sensing wires when a user rotates the rotation input device between the user's thumb and finger. For example, as the rotation input device is rolled between two of the user's fingers, the touch input provided by the user's fingers on opposing sides of the rotation input device moves around the surface of the rotation input device and causes a temporary change in capacitance to different individual sensing wires, which creates a pattern of capacitance changes from one sensing wire to the next. This pattern is used to detect rotational input to the rotation input device.

It is also possible for the sensing wires to be used to sense inputs other than rotation of the rotation input device between the thumb and finger. For example, taps can be detected based on short impulses in the capacitive response of the sensing wires. In another example, a "grab" gesture can be detected based on a large, sustained rise in the capacitive response. The electrodes can also be patterned on the rotation input device, such that each unique gesture activates a particular subset of electrodes, in a particular way, which is computationally distinguishable from other kinds of gestures a user might perform.

A rotation input device on a cord that can detect various types of touch input eliminates the need for moving parts, hardware, bulk, and thickness found in existing in-line controls for cords. At the same time, the cost to manufacture the in-line controls is reduced because there are no extra hardware controls that must be electrically connected. Additionally, manufacturing challenges resulting from fibers being woven into a long structure are reduced. Furthermore, the controller can be implemented to detect different types of touches to the sensing wires (e.g., rotation, long presses versus quick taps, pinches, or a sequence of touches) thereby increasing the total number of different functions that can be triggered from the cord.

The controller measures one or more capacitance values associated with the sensing wires. In response to detecting a pattern of change in the one or more capacitance values, the controller determines that the pattern of change in the capacitance values corresponds to rotational input caused by the user twisting or rotating the rotation input device of the cord. In some cases, the controller can also determine the direction of the rotational input (e.g., clockwise or counter-clockwise around a longitudinal axis of the rotation input device). Then, the controller initiates one or more functions based on the rotational input, such as increasing or decreasing the volume, scrolling through menu items, and so forth. In some cases, the cord can be further configured to detect tap or grab input caused by the user tapping or pressing and holding his or her fingers on the capacitively sensitive interface on the cord, and distinguish the rotational input from the tap or grab input.

Example Environment

Figure 1:
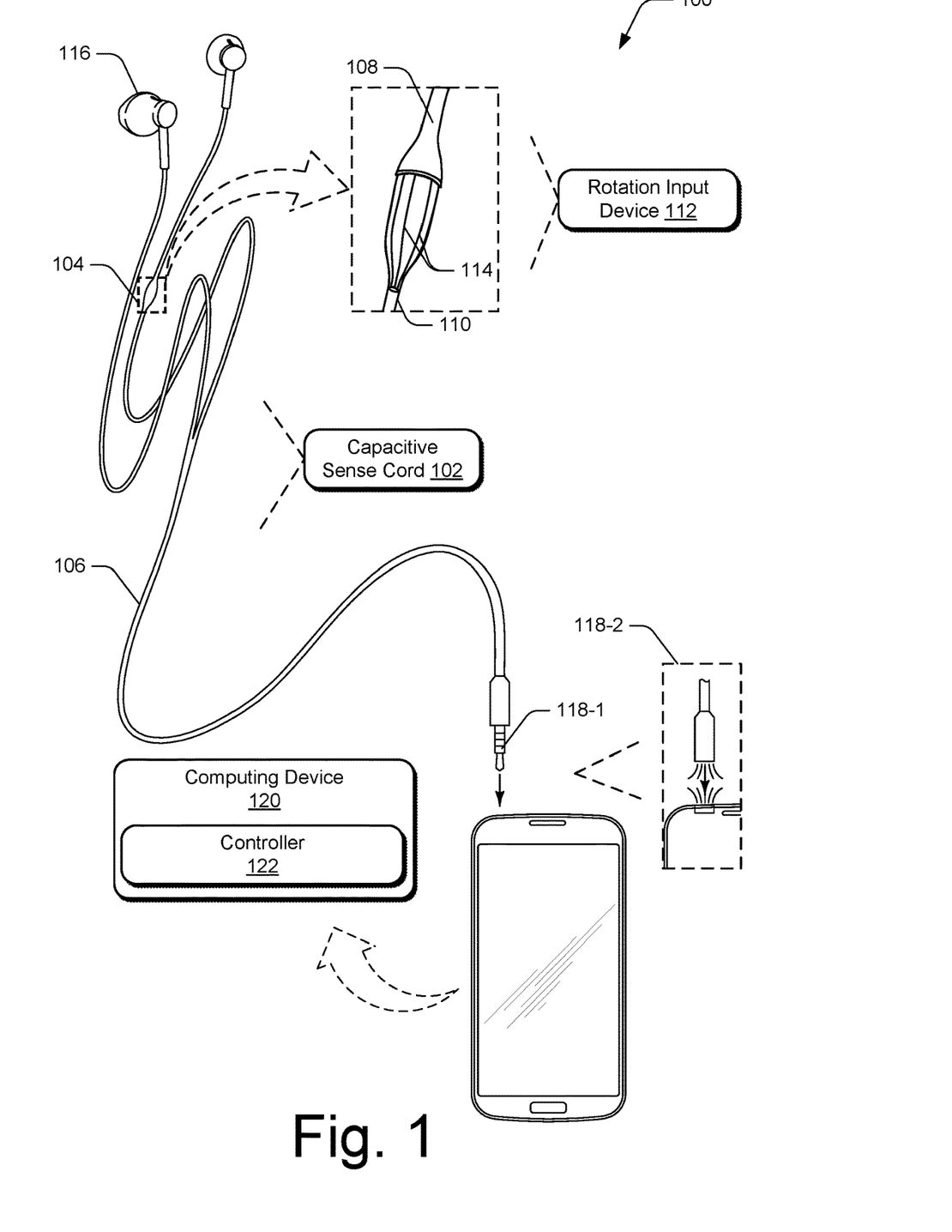
FIG. 1 is an illustration of an example environment in which techniques using, and objects including, a rotation input device for a capacitive sense cord may be implemented.

FIG. 1 is an illustration of an example environment 100 in which techniques using, and objects including, a rotation input device for a capacitive sense cord may be implemented. Environment 100 includes a capacitive sense cord 102, which has a capacitively sensitive portion 104 that is sensitive to touch input and an insensitive portion 106 that is not sensitive to touch input. In the environment 100, the cord 102 is illustrated as a cord for a headset. While the cord 102 is described as a cord for a headset, such as earbuds or headphones, the cord 102 may be utilized for various other types of uses, such as cords for appliances (e.g., lamps or fans), USB cords, SATA cords, data transfer cords, power cords, or other types of cords that are used to transfer data or media.

Figure 2:
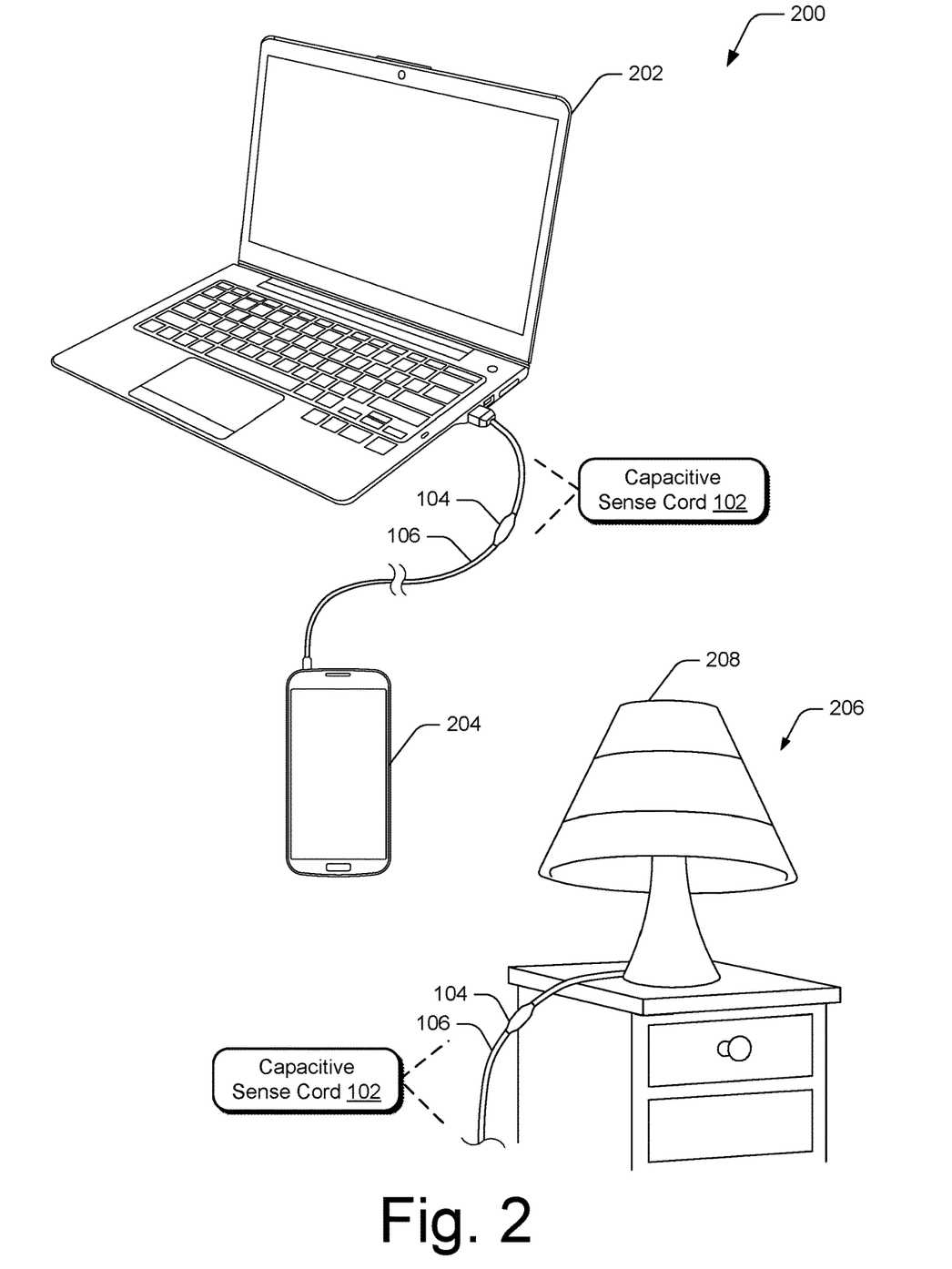
FIG. 2 illustrates additional environments in which a capacitive sense cord may be implemented.

Consider FIG. 2, which illustrates additional environments 200 in which the cord 102 can be implemented. In one example, the cord 102 is implemented as a data transfer cord configured to transfer data (e.g., media files) between a computer 202 and a mobile device 204. In this example, the cord 102 may be configured to receive touch input usable to initiate or pause the transfer of data between computer 202 and mobile device 204.

As another example, at an environment 206, the cord 102 is illustrated as a power cord for a lamp 208. In this example, the cord 102 may be configured to receive touch input usable to turn on and off the lamp and/or to adjust the brightness of the lamp.

Returning to FIG. 1, the cord 102 includes a cover 108 (e.g., cable jacket), which is configured to cover a cable 110 of the cord 102. The cord 102 also includes a rotation input device 112. In FIG. 1, a cutaway view shows an example of the rotation input device 112, which includes a portion of the cover 108 and the cable 110 beneath the cover 108. In this example, the cable 110 is configured to communicate audio data to a headset. In other implementations, however, the cable 110 can be implemented to transfer power, data, and so forth.

Instead of using separate hardware controls, the cord 102 is configured to capacitively sense touch input via the rotation input device 112. To do so, the cord 102 includes sensing wires 114. The sensing wires 114 are formed from conductive wire, which may be implemented using any of a variety of different conductive materials, such as copper, silver, gold, or aluminum. These sensing wires 114 are twisted within the cable 110 throughout most of the cord 102, but are disposed proximate to an inside surface of the cover 108 at the rotation input device 112, such that the sensing wires 114 are positioned near the surface of the cord 102. In this way, the rotation input device 112 is implemented as a capacitive sensing interface. The sensing wires 114 run lengthwise along the rotation input device 112 of the cord 102, and each sensing wire 114 is scanned individually to determine a capacitance value and any changes to the capacitance value. For example, when a finger of a user's hand approaches one or more sensing wires 114, the finger causes the capacitance of those sensing wires 114 to change (e.g., increase or decrease) based on the proximity of the finger to those sensing wires 114.

In the environment 100, the cord 102 includes earbuds 116 and a connector 118-1 that is configured to be plugged into, magnetically coupled to (e.g., connector 118-2), or otherwise communicatively coupled to, the computing device 120. The computing device 120 is illustrated as a mobile phone, but may also be configured as a desktop computer, a laptop computer, a tablet device, a wearable device, and so forth. Thus, the computing device 120 may range from full resource devices with substantial memory and processor resources (e.g., personal computers, game consoles) to low-resource devices with limited memory and/or processing resources (e.g., mobile devices).

The computing device 120 is illustrated as including the controller 122, which is representative of functionality to sense touch input to the rotation input device 112 of the cord 102, and to trigger various functions based on the touch input. For example, when the cord 102 is implemented as a cord for a headset, the controller 122 can be configured to, in response to touch input to the rotation input device 112, start playback of audio to the headset, pause audio, skip to a new audio file, adjust the volume of the audio, and so forth. In FIG. 1, the controller 122 is illustrated as being implemented at the computing device 120, however, in alternate implementations, the controller 122 may be integrated within the cord 102, or implemented with another device, such as powered headphones, a lamp, a clock, and so forth. Having discussed an example environment 100 in which the cord 102 may be implemented, consider now a more-detailed discussion of how the controller 122 detects touch input to the rotation input device 112 to trigger various functions.

Generally, the controller 122 is configured to scan the one or more sensing wires 114 of the rotation input device 112 to detect a change in capacitance to the sensing wires 114, which corresponds to touch input to the rotation input device 112.

Figure 3:
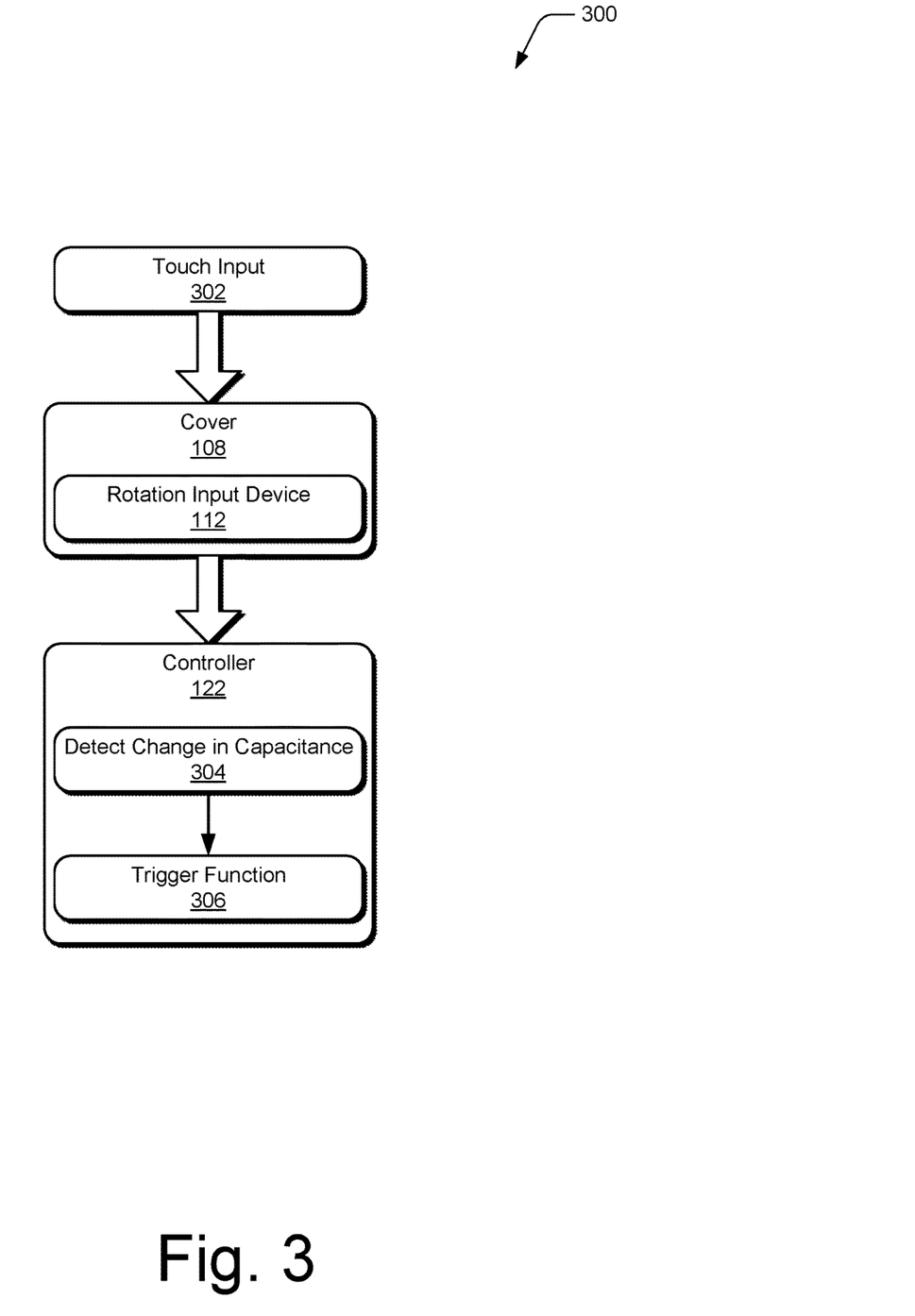
FIG. 3 illustrates an example system configured to detect input to a rotation input device of a capacitive sense cord.

Consider FIG. 3, which illustrates an example system 300 configured to detect touch input to a capacitively sensitive interface on the cord 102. In the system 300, touch input 302 is provided to a capacitively sensitive interface of the cord 102, such as an area corresponding to the rotation input device 112.

A variety of different types of touch input 302 may be provided. In one or more implementations, the touch input 302 may correspond to a pattern or series of touches to the rotation input device 112. As an example, a user may provide touch input by pinching the rotation input device 112. Doing so may trigger a function that is different than a function triggered by simply touching or tapping the rotation input device 112. In some aspects, after pinching the rotation input device 112, the user may roll the rotation input device 112 between the user's fingers to rotate the rotation input device 112 clockwise or counterclockwise around a longitudinal axis of the rotation input device 112. As the user rotates the rotation input device 112, different sensing wires running lengthwise along the rotation input device 112 experience changes in capacitance, such that a pattern of changes in capacitance is detected. Further detail of this and other aspects is described below.

Figure 4:
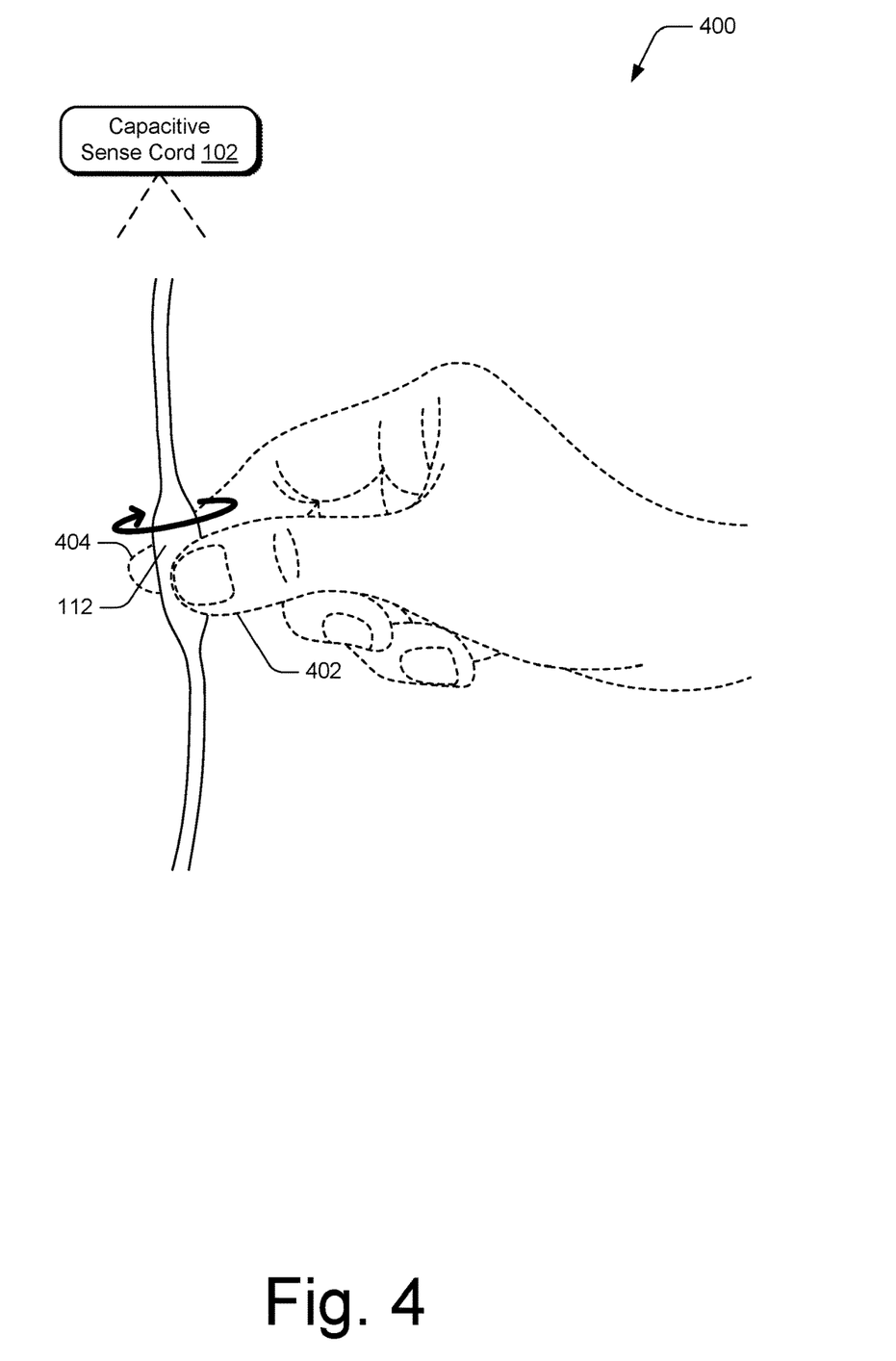
FIG. 4 illustrates an example of providing rotational input to a rotation input device of a capacitive sense cord.

By way of example, consider FIG. 4, which illustrates an example 400 of providing touch input to a capacitively sensitive interface of a cord. In the example 400, a user grips the rotation input device 112 of the cord 102 between a thumb 402 and a forefinger 404, such that the thumb 402 and the forefinger 404 contact opposing sides of the rotation input device 112. When the thumb 402 and forefinger 404 move close to the rotation input device 112, the sensing wires 114 underneath the cover 108 that are proximate the thumb 402 and forefinger 404 experience a change in capacitance. In some cases, the touch input can be provided by moving the thumb 402 or the finger 404 close to the rotation input device 112 without physically touching the rotation input device 112.

Returning to FIG. 3, at 304, the controller 122 detects a change in capacitance to at least some of the sensing wires 114, associated with the rotation input device 112, when the touch input 302 is provided to the rotation input device 112 of the cord 102. To sense the touch input 302, the controller 122 may use a capacitance meter that can detect the change in capacitance of a single sensing wire or multiple sensing wires disposed parallel to each other. Generally, when a finger touches, or comes in close contact to, a sensing wire 114, a capacitance is formed between the finger and the associated sensing wire 114. This capacitance may be detected by the capacitance meter of the controller 122 to determine that the touch input has occurred.

The controller 122 may be implemented to detect the change in capacitance in a variety of different ways, such as using self-capacitance sensing, which detects a change in capacitance of an electrically charged sensing wire. In this case, the sensing wire 114 is not grounded. When not being touched, a small baseline capacitance exists, which may be measured by the capacitance meter. When the user's finger comes in the vicinity of the sensing wire 114, however, a touch-input capacitance is formed between the fingertip and the sensing wire 114. This capacitance is electrically connected in parallel to the baseline capacitance, causing the capacitance meter to detect the touch input.

At 306, in response to detecting the change in capacitance or a pattern of capacitance changes, the controller 122 triggers a function associated with the touch input 302. Notably, the controller 122 can trigger a variety of different types of functions based on how the cord 102 is being utilized. For example, when the cord 102 corresponds to a cord for a headset, the controller 122 may trigger functions such as playing audio (e.g., a song, a video, an audiobook file, or a voice memo), pausing audio, fast forwarding audio, skipping to a next audio track, adjusting the volume of the audio, and so forth. As another example, when the cord 102 corresponds to a data transfer cord, the controller 122 may trigger functions such as starting the transfer of data, stopping the transfer of data, authenticating the user to enable the transfer of data, and so forth. When the cord 102 corresponds to a cord for an appliance (e.g., a lamp, a fan, or an alarm clock), the controller 122 may trigger functions such as turning on or off the appliance, adjusting the brightness of a lamp, adjusting the speed of a fan, activating the snooze button on an alarm clock, and so forth.

In some cases, functions may be associated with various combinations, sequences, or patterns of rotational touch input to the rotation input device 112. For example, a function may be associated with a first clockwise rotation of the rotation input device 112, while a different function may be associated with a sequence of rotations, such as a clockwise rotation followed by a quick counterclockwise rotation and then another clockwise rotation. Other rotational patterns are also contemplated, which may be mapped to any suitable function.

Figure 5:
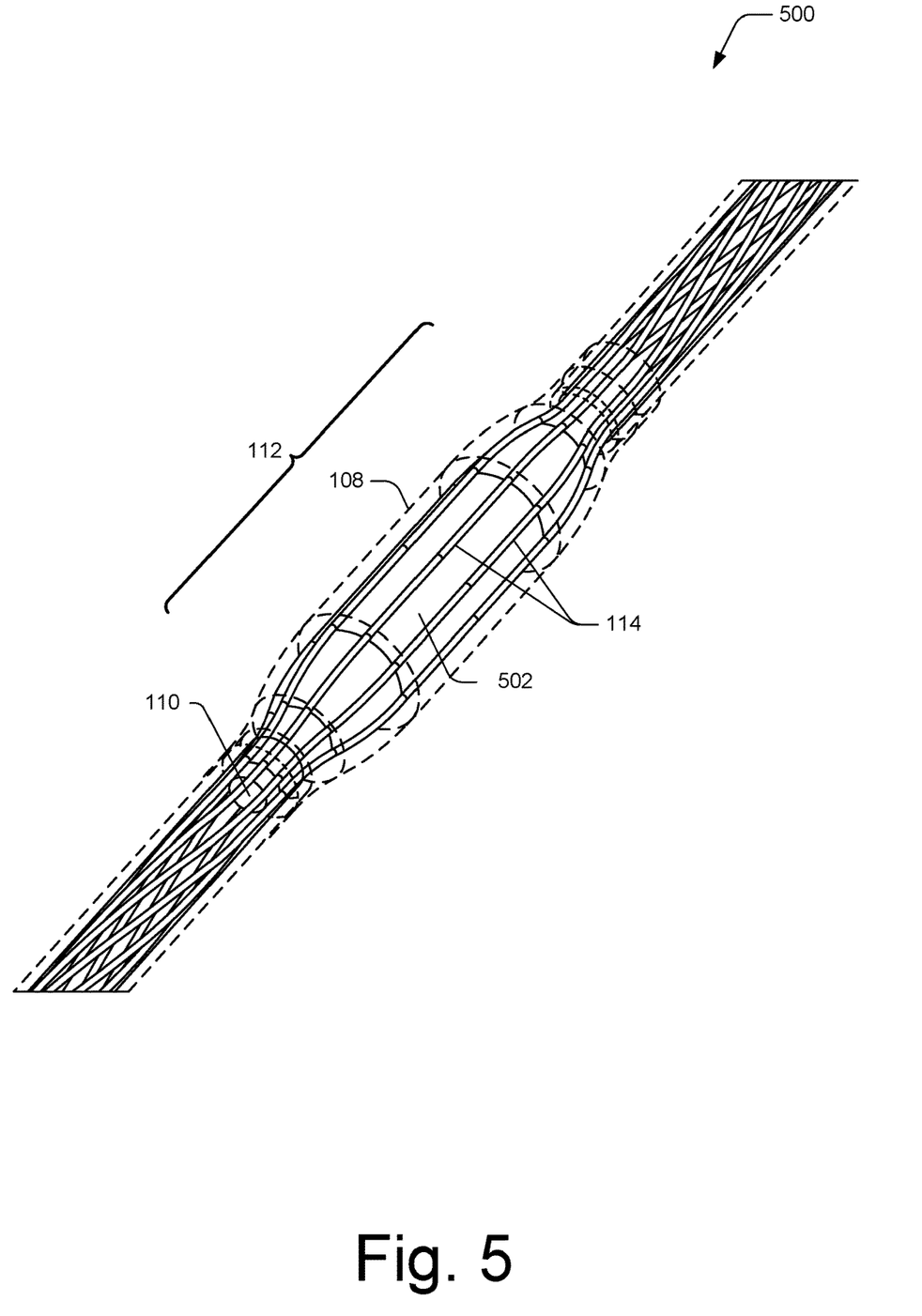
FIG. 5 illustrates an example structure of a rotational input device on a capacitive sense cord.

FIG. 5 illustrates an example implementation 500 of the rotation input device 112 of the cord 102. As noted, the cord 102 is constructed with capacitive sensing wires 114, the cable 110, and the cover 108. Optionally, the cord 102 can also include a shield wire, which is discussed in further detail below. The example implementation 500 illustrates the cable 110 and six capacitive sensing wires 114 underneath the cover 108. The sensing wires 114 are twisted around themselves inside the cable 110 throughout a substantial length of the cord 102, such as above and below the rotation input device 112. The cord 102 is insensitive to touch input where the sensing wires 114 are twisted around themselves. In aspects, the sensing wires 114 are twisted around themselves throughout the insensitive portion 106 of the cord 102.

In the rotation input device 112, however, the sensing wires 114 are brought near the surface of the cord 102, such as proximate to an inside surface of the cover 108, and run straight along the length of the cable. Here, the sensing wires 114 are independently sensitive to touch input. Further, within the rotation input device 112, the sensing wires 114 run substantially parallel to one another and the cable 110. This configuration allows the rotation input device 112 to be capacitively sensitive to touch input. In addition, the sensing wires 114 are spaced apart from one another by a mechanical object 502. The mechanical object 502 can include any suitable object, examples of which include a plastic part, or a portion of an inner core of the cord 102 that is locally thicker within the rotation input device 112. The cover 108 can be formed from any suitable material, examples of which include a silicon rubber or thermoplastic elastomer (TPE) overmold to completely cover the wires, secure the wires in place, and hide and protect them from the environment. The material used for the cover 108 is configured to be a flexible, waterproof material that seals the cable and prevents water from permeating the seal. Although the example implementation 500 is illustrated with six sensing wires 114, any suitable number of sensing wires 114 can be used, such as 7, 8, 9, 10, or more wires. Three wires can be used as a minimum number of sensing wires to detect rotational input.

Figure 6:
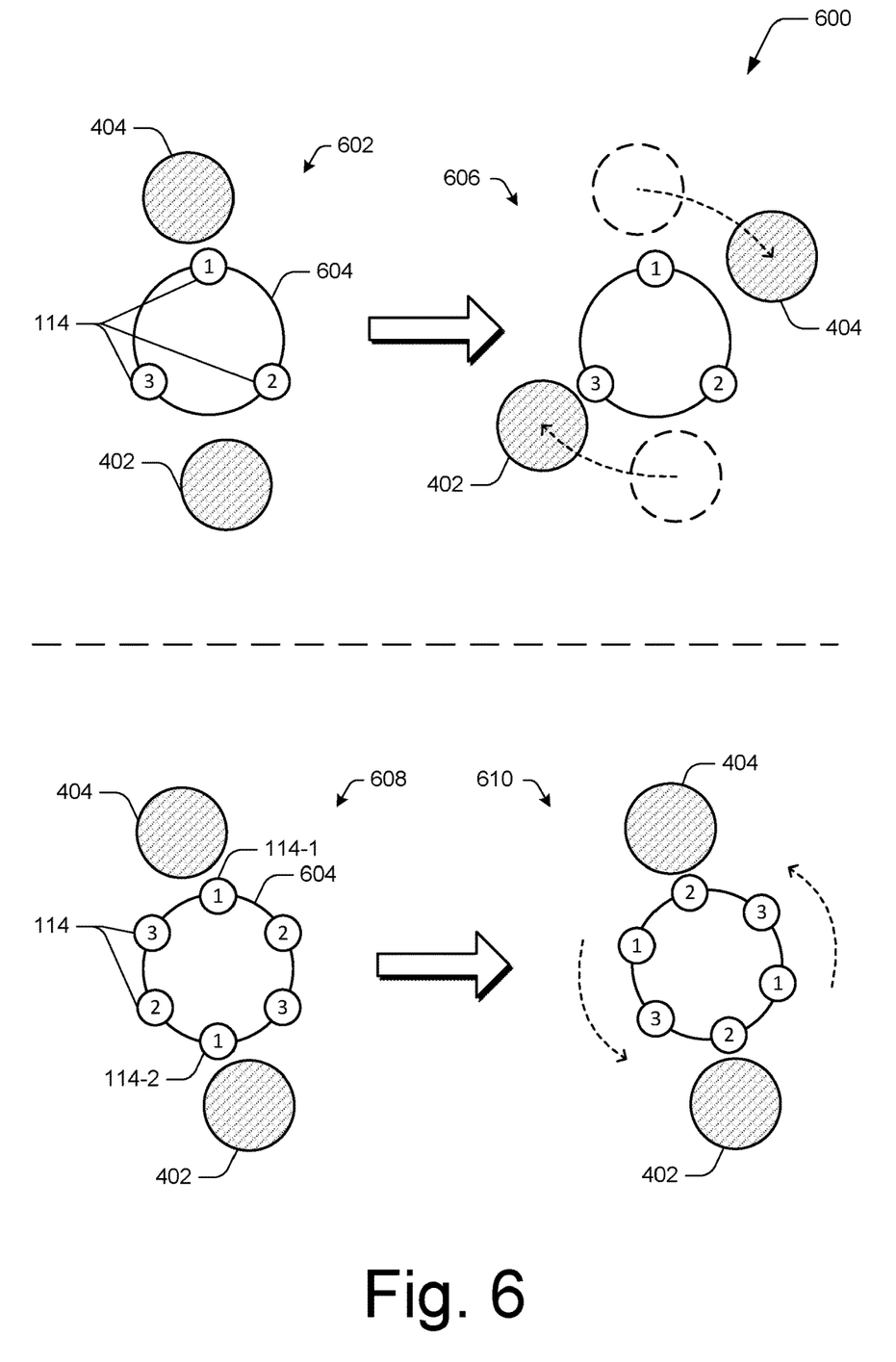
FIG. 6 illustrates example diagrams of rotational input provided to a rotation input device of a cord.

Consider, for example, FIG. 6, which illustrates cutout examples 600 of rotational input provided to the rotation input device 112 of the cord 102. When the sensing wires 114 are disposed proximate to the surface of the cord 102, the sensing wires 114 are arranged in a manner suitable to detect rotation between the user's thumb and forefinger. At 602, a first example is illustrated in which a user touches the rotation input device 112 on opposing sides (approximately 180 degrees apart in relation to a center axis of the cord 102) of the rotation input device 112 using two fingers, such as the thumb 402 and the forefinger 404. Here, the rotation input device 112 includes three sensing wires 114 corresponding to three capacitance-sensing channels, such as integrated circuit (IC) channels, e.g., channels "1", "2", and "3". The sensing wires have a spatial orientation that enables detection of rotational input to the rotation input device 112. For example, the sensing wires 114 are equally spaced around a center portion 604 of the rotation input device 112.

At 602, a change in capacitance is detected via channel "1" based on the proximity of the user's forefinger 404 to a sensing wire 114 corresponding to the channel "1". At 606, the user's thumb 402 moves to the left while the user's forefinger 404 moves to the right. Based on this movement, the forefinger 404 moves away from channel "1", which reduces the amount of change in capacitance of the sensing wire on channel "1", causing a capacitance value of channel "1" to begin to return to its original or base value. In addition, the thumb 402 moves toward the sensing wire associated with channel "3", which changes the capacitance of that sensing wire. Continuing the movement of the thumb 402 and forefinger 404 may then result in a capacitance change to a sensing wire on channel "2" while the capacitance value of channel "3" begins to return to its original or base value. Accordingly, a sensing pattern of capacitance changes over a duration of time can be detected as capacitance changes via channels "1", "3", and then "2", which indicates a counterclockwise rotation of the rotation input device 112, or movement of the user's fingers around the rotation input device 112 in a clockwise direction. If the user rolls the rotation input device 112 in the opposite direction, then the pattern of capacitance changes may be detected over a duration of time via channels "1", "2", and then "3", which indicates a clockwise rotation of the rotation input device 112 or movement of the user's fingers around the rotation input device 112 in a counterclockwise direction.

In addition, the controller 122 can determine other attributes of the rotational input, such as speed or amount of rotation. For example, a speed of rotation of the rotational input can be determined by detecting a duration of time that expires between the capacitance changes of each channel over the course of the rotation. The speed of the rotational input can indicate a slow rotation or a quick rotation. The controller 122 can also detect an amount of rotation of the rotation input, such as a short rotation (e.g., quarter-turn, half-turn) or a long rotation (e.g., three-quarter turn, full-turn) of the rotation input device 104. Using various different combinations of detectable attributes of the rotational input, such as the speed, direction, and/or amount of rotation, enables the rotational input to have a variety of different forms that can each be mapped to a unique operation or functionality of a device connected to the cord 102.

At 608, a second example is illustrated in which the rotation input device 112 includes six sensing wires 114. In at least some aspects, the sensing wires 114 are substantially equally spaced apart around the center portion 604 of the rotation input device 112. Here, the sensing wires 114 are arranged in a repeating configuration where the sensing pattern repeats over a 180-degree slice of the rotation input device 112. This repeating mechanism has the advantage of providing a stronger signal for grips where the finger and thumb grip on opposite sides of the rotation input device 112, when compared to the simple three-wire configuration at 602. In one or more implementations, each of the six sensing wires 114 can have a separate connection to the IC, which allows for symmetry to be implemented in software by adding the response of opposing sensing wires together. Alternatively, each pair of opposing sensing wires 114 can have a same connection to the IC, which provides the symmetry via hardware. For instance, opposing sensing wires 114-1 and 114-2 both correspond to channel "1".

At 608, the user grips the rotation input device 112 at locations corresponding to the sensing wires 114 associated with channel "1". Then, at 610, the user rolls the rotation input device 112 in a counterclockwise direction such that the touch input is now detected at channel "2". Rolling the rotation input device 112 further in the counterclockwise direction results in the touch input being detected at channel "3". This pattern of capacitance changes over a duration of time via channels "1", "2", and then "3" and so forth, indicates a counterclockwise rotation of the rotation input device 112. A pattern of changes in capacitance via channels "1", "3", and then "2" may indicate a clockwise rotation of the rotation input device 112.

In some aspects, the touch input may change the capacitance of multiple adjacent sensing wires 114. For instance, the user's thumb 402 may, either when gripping or rotating the rotation input device 112, touch adjacent sensing wires corresponding to channels "1" and "3". When the user rotates the rotation input device 112, as in 610, the thumb 402 may move away from channel "3" and toward channel "2", while still activating channel "1". Here, a pattern is generated from channels "3" and "1" to channels "1" and "2", which can be used to determine a counterclockwise rotation of the rotation input device 112.

The non-active part of the cord 102, such as the insensitive portion (106) may have a high impact on the sensitivity of the cord 102. Because the sensing wires 114 are twisted together inside a cable jacket, there is a high capacitance between the wires. This high capacitance between wires can be offset, however, by introducing a shield wire, or by using a sensing technique that cancels out the extra capacitance added by the wires inside the cord 102.

In a wire bundle, the closest metal objects to a sensing wire 114 are adjacent wires. Thus, a capacitive sense test on the sensing wire 114 detects the capacitance of not only a user's finger, but also of those adjacent wires. Extra capacitance provided by the adjacent wires can be offset or canceled out, however, by driving those wires at the same voltage as the voltage used to sense capacitance on the sensing wire 114, such as a square wave having a known amplitude and a known frequency. In this way, capacitance is measured when there is a difference in voltage between two sensing wires. If those two sensing wires have the same voltage, then there is no stored charge between them.

The offset may be implemented by using the other sensing wires 114 in the bundle. In aspects, each sensing wire 114 in the system is scanned individually, one at a time, while the other sensing wires 114 remain idle. In one example, when sensing capacitance on a first sensing wire corresponding to channel "1", adjacent wires corresponding to channels "2" and "3" can be used to apply the voltage offset or the capacitive cancellation offset to the first sensing wire.

When using a shield wire, an offset signal is also used, but is driven on another wire (or set of wires) that is wrapped around or otherwise encompasses the sensing wires 114. In one or more implementations, the shield wire can be implemented as a separate braided shield that surrounds all the wires. Alternatively, the shield wire can be implemented as a separate braided shield that surrounds each individual wire. In at least one example, a combination of shield wires can be used to surround one or more individual wires and all the wires together. The shield wire(s) shields the sensing wires from effects of parasitic capacitance, which can include unwanted feedback resulting in parasitic oscillations of an amplifier circuit, stray inductance that resonates with an inductor to make the inductor self-resonant, unwanted capacitance that reduces bandwidth of an operational amplifier, or crosstalk (e.g., signal from one circuit bleeding into another) between circuits resulting in interference and unreliable operation. In one example, the three sensing wires 114 at 602 can be twisted around each other in the insensitive portions 106 of the cord 102, and then a shield wire can be wrapped around all three sensing wires 114 to shield them from any extra capacitance from other wires in the bundle, such as headphone wires or microphone wires.

Example Methods

Figure 7:
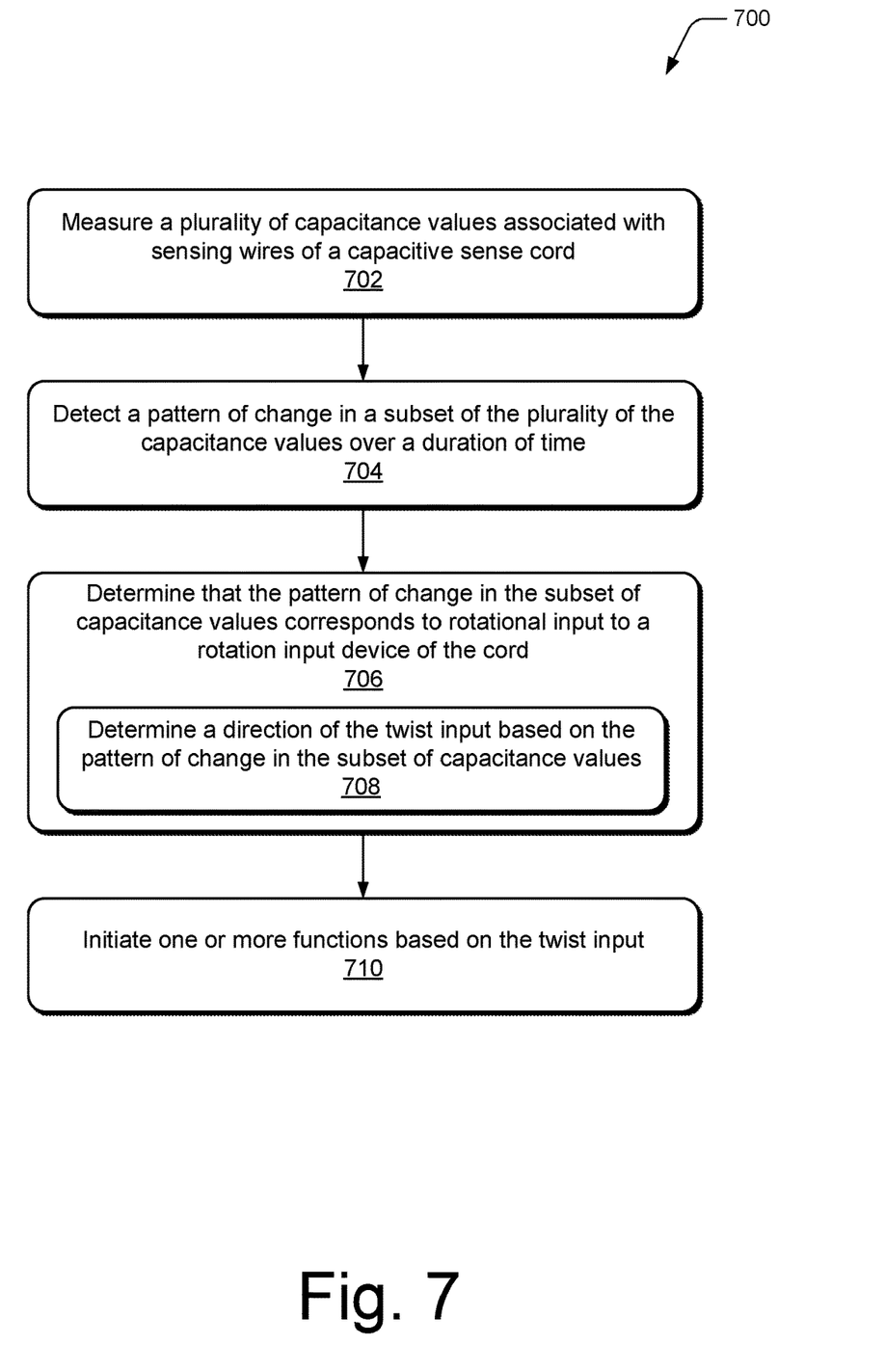
FIG. 7 illustrates a method of detecting rotational input with a capacitive sense cord.

FIG. 7 illustrates an example method 700 of detecting rotational input via a rotation input device on a capacitive sense cord. This method and other methods herein are shown as sets of blocks that specify operations performed but are not necessarily limited to the order or combinations shown for performing the operations by the respective blocks. The techniques are not limited to performance by one entity or multiple entities operating on one device.

At 702, a plurality of capacitance values associated with sensing wires of a capacitive sense cord are measured. For example, the controller 122 (FIG. 1) measures one or more capacitance values associated with the sensing wires 114 of the cord 102. As described above, each sensing wire 114 may be scanned individually, one at a time, to determine the capacitance value of each sensing wire 114.

At 704, a pattern of change in a subset of the plurality of capacitance values over a duration of time is detected. For example, the controller 122 detects a pattern of change in the capacitance values associated with sensing wires 114 of the cord 102. Example patterns of capacitance changes are described in relation to FIG. 6.

At 706, it is determined whether the pattern of change in the subset of capacitance values corresponds to rotational input to a rotation input device of the cord. For example, the controller 122 determines whether the pattern of change in the subset of capacitance values corresponds to rotational input to the rotation input device 112 of the cord 102. Optionally, at 708, a direction of the rotational input is also determined. For example, the controller 122 determines a direction of the rotational input (e.g., clockwise or counter-clockwise) based on the pattern of change in the subset of capacitance values.

At 710, one or more functions are initiated based on the rotational input. For example, the controller 122 initiates one or more functions that are associated or otherwise mapped to the rotational input, such as increasing or decreasing volume to a headset, scrolling through menu items, and so forth. In some cases, the one or more functions are initiated based at least in part on the direction of the rotational input, a speed of the rotational input, an amount of rotation of the rotational input, and/or a sequence of different rotations.

Example Computing System

Figure 8:
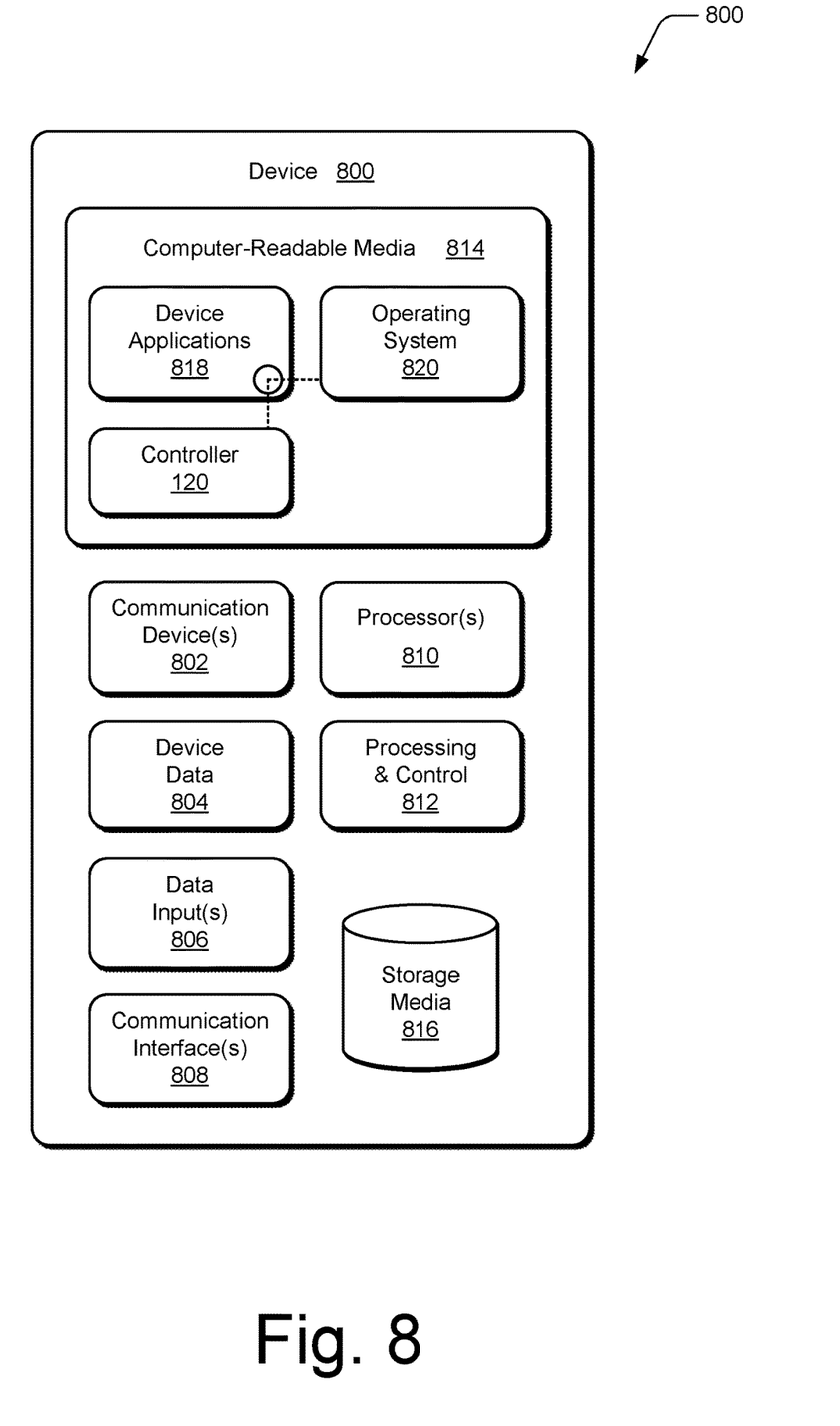
FIG. 8 illustrates various components of an example computing system that can be implemented as any type of client, server, and/or computing device as described with reference to the previous FIGS. 1-7 to implement a rotation input device for a capacitive sense cord.

FIG. 8 illustrates various components of an example the computing system 800 that can be implemented as any type of client, server, and/or computing device as described with reference to the previous FIGS. 1-7 to implement a rotation input device on a capacitive sense cord. In embodiments, the computing system 800 can be implemented as one or a combination of a wired and/or wireless wearable device, System-on-Chip (SoC), and/or as another type of device or portion thereof. The computing system 800 may also be associated with a user (e.g., a person) and/or an entity that operates the device such that a device describes logical devices that include users, software, firmware, and/or a combination of devices.

The computing system 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on the computing system 800 can include any type of audio, video, and/or image data. The computing system 800 includes one or more data inputs 806 via which any type of data, media content, and/or inputs can be received, such as human utterances, touch data generated by the cord 102, user-selectable inputs (explicit or implicit), audio and/or video signals transmitted via the cable 110, messages, music, television media content, recorded video content, and any other type of audio, video, and/or image data received from any content and/or data source.

The computing system 800 also includes communication interfaces 808, which can be implemented as any one or more of a serial and/or parallel interface, a wireless interface, any type of network interface, a modem, and as any other type of communication interface. The communication interfaces 808 provide a connection and/or communication links between the computing system 800 and a communication network by which other electronic, computing, and communication devices communicate data with the computing system 800.

The computing system 800 includes one or more processors 810 (e.g., any of microprocessors, controllers, and the like), which process various computer-executable instructions to control the operation of the computing system 800 and to enable techniques for, or in which can be embodied, a capacitive sense cord. Alternatively or in addition, the computing system 800 can be implemented with any one or combination of hardware, firmware, or fixed logic circuitry that is implemented in connection with processing and control circuits which are generally identified at 812. Although not shown, the computing system 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 800 also includes computer-readable media 814, such as one or more memory devices that enable persistent and/or non-transitory data storage (e.g., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 800 can also include a mass storage media device 816.

The computer-readable media 814 provides data storage mechanisms to store the device data 804, as well as various device applications 818 and any other types of information and/or data related to operational aspects of the computing system 800. For example, an operating system 820 can be maintained as a computer application with the computer-readable media 814 and executed on the processors 810. The device applications 818 may include a device manager, such as any form of a control application, software application, signal-processing and control module, code that is native to a particular device, a hardware abstraction layer for a particular device, and so on.

The device applications 818 also include any system components, engines, or managers to implement a capacitive sense cord with a rotation input device. In this example, the device applications 818 include the controller 122.

CONCLUSION

Although embodiments of a rotation input device for a capacitive sense cord have been described in language specific to features and/or methods, it is to be understood that the subject of the appended claims is not necessarily limited to the specific features or methods described. Rather, the specific features and methods are disclosed as example implementations of a rotation input device for a capacitive sense cord.

What is claimed is:

1. A capacitive sense cord comprising:
a cable;
a cable jacket configured to cover the cable; and
a plurality of sensing wires disposed inside the cable jacket and around the cable throughout first and second portions of the cord,
the first portion of the cord including the plurality of sensing wires disposed proximate to a surface of the cord and positioned lengthwise along the cord to form a rotation input device configured to be capacitively sensitive to touch input, the rotation input device configured to enable rotational input based on a pattern of change in capacitance values corresponding to at least a subset of the plurality of sensing wires in the rotation input device; and
the second portion of the cord configured to be insensitive to touch input based on the plurality of sensing wires being twisted around one another within the second portion.

2. The capacitive sense cord of claim 1, further comprising a controller configured to initiate, based on the rotational input, one or more functions at a computing device that is communicatively coupled to the cord.

3. The capacitive sense cord of claim 2, wherein the controller is further configured to determine a clockwise or counterclockwise direction of the rotational input based on the pattern of change in the capacitance values.

4. The capacitive sense cord of claim 1, further comprising a controller configured to initiate:
a first function at a computing device based on a first pattern of change in the capacitance values; and
a second function at the computing device based on a second pattern of change in the capacitance values that is different than the first pattern.

5. The capacitive sense cord of claim 1, further comprising a shield wire wrapped around the plurality of sensing wires in the second portion of the cord.

6. The capacitive sense cord of claim 1, wherein the plurality of sensing wires are associated with at least three channels of an integrated circuit for detection of the pattern of change in capacitance values.

7. The capacitive sense cord of claim 1, wherein the plurality of sensing wires are connected to an integrated circuit via at least three channels, and wherein each of the at least three channels corresponds to two sensing wires of the plurality of sensing wires that are disposed on opposing sides of the rotation input device.

8. A system comprising:
a capacitive sense cord having a plurality of sensing wires disposed throughout a first portion of the capacitive sense cord that is sensitive to touch input and a second portion of the capacitive sense cord that is insensitive to touch input, the plurality of sensing wires being twisted around one another within a cable jacket of the second portion of the capacitive sense cord, the plurality of sensing wires being disposed proximate to a surface of the first portion of the capacitive sense cord and positioned lengthwise along the first portion of the capacitive sense cord to form a rotation input device; and
a controller implemented at the capacitive sense cord, the controller configured to:
measure capacitance values associated with the plurality of sensing wires;
detect a pattern of change in the capacitance values;
determine that the pattern of change in the capacitance values corresponds to rotational input to the rotation input device; and
initiate one or more functions at a computing device communicatively coupled to the capacitive sense cord based on the rotational input.

9. The system of claim 8, wherein the controller is further configured to:
determine a direction of the rotational input; and
initiate the one or more functions based at least in part on the direction of the rotational input.

10. The system of claim 9, wherein the determined direction of the rotational input corresponds to a clockwise or a counterclockwise direction around a center axis of the rotation input device.

11. The system of claim 8, wherein the plurality of sensing wires are associated with at least three channels of an integrated circuit.

12. The system of claim 8, wherein the plurality of sensing wires are connected to an integrated circuit via at least three channels, and wherein each of the at least three channels is connected to two sensing wires of the plurality of sensing wires that are disposed on opposing sides of the rotation input device.

13. The system of claim 8, wherein the capacitive sense cord includes a cable within the cable jacket, and wherein the cable is configured to communicate audio data from the computing device to a headset or transfer power or data to the computing device.

14. The system of claim 8, wherein the controller is further configured to offset extra capacitance provided by adjacent sensing wires to a respective sensing wire of the plurality of sensing wires by driving the adjacent sensing wires and the respective sensing wire at a same voltage.

15. The system of claim 8, wherein the plurality of sensing wires are driven at a same voltage, and wherein the controller is configured to measure the capacitance values based on a difference in voltage between two or more of the plurality of sensing wires.

16. The system of claim 8, wherein the capacitance sense cord includes a shield wire configured to shield a respective sensing wire of the plurality of sensing wires from parasitic capacitance.

17. The system of claim 8, wherein the capacitance sense cord includes a shield wire wrapped around the plurality of sensing wires in the second portion of the cord that is insensitive to touch input.

18. The system of claim 8, wherein the cord comprises a cord for ear buds or headphones, a data transfer cord, or a power cord.

19. A method implemented by a controller coupled to a capacitive sense cord that includes a capacitively sensitive portion that is sensitive to touch input and an insensitive portion that is insensitive to touch input, the method comprising:
measuring capacitance values associated with sensing wires of the cord, the sensing wires disposed throughout the sensitive portion and the insensitive portion of the capacitive sense cord, the insensitive portion including the sensing wires twisted around one another within a cable jacket of the capacitive sense cord, the sensitive portion forming a rotation input device based on the sensing wires being:
disposed within the cable jacket;
proximate to a surface of the cord; and
positioned lengthwise along the sensitive portion;
detecting a pattern of change in capacitance-sensing channels of an integrated circuit that are coupled to the sensing wires;
determining that the pattern of change in the capacitance-sensing channels corresponds to rotational input to the capacitively sensitive portion of the cord; and
initiating one or more functions based on the rotational input.

20. The method of claim 19, further comprising determining a direction of the rotational input based on the pattern of change in the capacitance-sensing channels, wherein the initiating one or more functions is based at least in part on the direction of the rotational input.

* * * * *